3,368,991
TRANSFER INK AND COATED TRANSFER PAPER CONTAINING ETHYLENE/VINYL ACETATE COPOLYMER AND NATURALLY OCCURRING WAX
Robert Rosenbaum, Hanover Township, Morris Plains, Morris County, and Richard A. Signorelli, Clifton, N.J., assignors to Allied Chemical Corporation, New York, N.Y., a corporation of New York
No Drawing. Filed Feb. 19, 1964, Ser. No. 345,850
6 Claims. (Cl. 260—28.5)

ABSTRACT OF THE DISCLOSURE

The present invention more specifically describes and relates to oil retentive wax compositions comprising blends of a minor portion of a low molecular weight ethylene-vinyl acetate copolymer wax with major portions of naturally occurring wax, and the production of new and improved carbon black containing transfer inks suitable for carbon paper and the like and containing said blends of ethylene-vinyl acetate copolymer wax with naturally occurring wax.

---

This invention relates to pressure transferable ink compositions and to transfer papers of the "carbon paper" type coated therewith, and more particularly to those carbon papers coated with waxy compositions containing appreciable proportions of carbon black pigment.

Carbon paper inks of the wax base type are commonly compounded from mixtures of paraffin wax blended with naturally occurring non-petroleum waxes, such as vegetable or insect waxes, and a non-drying oil such as mineral oil, together with coloring agents such as pigments and dyes. The presence of non-drying oil is necessary to provide ready release of the pigment or color which is to be transferred from the carbon paper, and to produce softness and compactness of the ink. The ideal wax composition from the point of view of economy would be one composed entirely of paraffin wax. Unfortunately, compositions containing paraffin wax as the only wax constituent, together with oil, allow the oil to bleed or sweat out of the composition, and moreover are deficient in a number of desirable characteristics needed in the inks, such as smooth flow, sharp imprint, low blocking tendencies and the like. Accordingly it has been customary to utilize a non-petroleum, oil-retaining wax, usually a naturally occurring vegetable or insect wax, such as carnauba wax, candelilla wax, ouricuri wax, sugarcane wax, beeswax, etc., as a portion of the wax component of the wax foundation of the carbon paper inks.

Coloring of the ink is accomplished by the incorporation of dyes and/or pigments in the wax-oil composition and carbon black is widely used. Carbon black pigment gives good covering power but, as it tends to transfer as a brownish black, is usually supplemented by toners such as nigrosine, methyl violet, etc.

As brought out above, good flow properties are essential in a satisfactory transfer ink. Such inks are customarily applied as hot melts at temperatures of about 190° to 210° F. and should have viscosities at about 200° F. in the range between about 20 centipoises and about 500 centipoises, for application in conventional equipment.

The inks must also have good oil retention, and this property is customarily supplied by the oil-retaining wax component such as vegetable waxes which oridinarily must be present in proportions of at least about equal in weight to the weight of oil present to adequately insure acceptable oil retention.

The prior art non-petroleum oil-retaining waxes such as the naturally occurring waxes as a group, however, have a number of disadvantages. They are high in cost, dark in color, seasonal in quantity and foreign in source, and hence not always dependably available. It would, therefore, appear desirable to provide compositions in which such prior naturally occurring waxes could be eliminated or reduced in proportions.

Attempts to substitute all or portions of the vegetable waxes in the above types of compositions with synthetic waxes such as low molecular weight polyethylene waxes have been unsuccessful, in that the presence of such waxes in appreciable quantities, e.g. in quantities above about 1% of the ink composition, causes the composition to gel in the presence of carbon black and thus prevents application of the ink to substrates by hot melt coating techniques.

It is a primary object of the invention to provide a new non-gelling, non-bleeding pressure transferable ink containing a synthetic wax and containing carbon black as a major constituent of the transferable color component.

Another object of the invention is to substitute an appreciable proportion of the non-petroleum, naturally occurring wax, such as vegetable wax, normally present in carbon-black-containing oil-wax base transfer inks, with a synthetic wax, as defined hereinafter, without adversely affecting the oil-retention properties of the transfer ink and without resulting in gelation of the composition by the carbon black pigment.

These and other objects are accomplished according to our invention wherein an oil-retaining wax component consisting of a homogeneous blend of between about 10% and about 30% by weight of a waxy ethylene/vinyl acetate copolymer containing between about 10% and about 30% vinyl acetate, and between about 90% and about 70% of a naturally occurring oil-retentive wax as hereafter defined, is used as the non-petroleum wax component of the standard transfer ink.

The compositions thus obtained have certain technical advantages not possessed by ink compositions containing only the prior art oil-retaining vegetable or insect waxes, namely, less smearing, less dye bleed, and greater film toughness.

The inks of our invention comprises a basic components (1) an oil-retentive wax composed of waxy ethylene/vinyl acetate copolymer and a non-petroleum naturally occurring vegetable or insect wax, (2) a paraffin wax, (3) a mineral oil, (4) carbon black, (5) a toner such as methyl violet and, if desired, other pigments and/or extenders.

Typical inks according to our invention, suitable as typewriter inks, have proportions of components given below in weight percent.

| | Range | Optimum |
|---|---|---|
| Oil-retaining wax | 12-20 | 18 |
| Reqned Paraffin wax | 20-40 | 30 |
| Mineral oil | 15-30 | 23 |
| Carbon black | 5-15 | 10 |
| Toner | | 1 |
| Extender pigments | | 18 |
| | | 100 |

The oil-retaining, non-petroleum wax is a mixture of between about 10% and about 30% of an ethylene/vinyl acetate copolymer as defined hereinafter and between about 90% and about 70% of an oil-retentive naturally occurring vegetable or insect wax. Its function is to retain the oil in the composition, i.e., prevent bleeding out of the oil, and to solubilize the toner in the ink composition. The proportion of oil-retaining, non-petroleum wax, therefore, will vary with the mineral oil content and should be used in the ratio of between about 0.60 part and about 1.0 part by weight of non-petroleum wax per part of mineral oil, within the ranges of proportions specified in the above formula.

The ethylene/vinyl acetate copolymer used in our invention should have a vinyl acetate content of at least about 10% by weight, preferably between about 10% and about 30%, copolymers containing less than about 10% vinyl acetate tend to cause gelation of the ink to occur in the presence of carbon black, copolymers containing more than about 30% vinyl acetate are unsuitable because of (1) their high viscosities which are reflected in a correspondingly high viscosity ink, and (2) because of the higher solubility of the polymer in the oil component thus reducing the oil-retention properties of the inks prepared from such copolymers.

The waxy ethylene/vinyl acetate copolymer used in the inks of our invention can be prepared by polymerizing an ethylene-vinyl acetate mixture at about 190° to 210° C. and about 7000 p.s.i.g. in the presence of hydrogen peroxide as catalyst, in the proportions of ethylene to vinyl acetate to yield copolymers containing between about 10% and about 30% vinyl acetate. The resultant polymers have average molecular weights in the range between about 1,000 and about 5,000, as determined according to the method described by J. J. Neumayer in Analytica Chimica Acta, vol. 20 (1959) pages 519–523, using differential temperature and resistance of thermistors exposed respectively to the vapor of a solvent, and to a solution in the same solvent, of the compond to be tested. They have softening points Ring & Ball between about 195° F. and about 205° F. and kinematic viscosities between about 50 centipoises and about 2,000 centipoises at 140° C., preferably between about 100 and about 1,000 centipoises. These viscosities are representative of fluidities which are normally considered too great for accurate measurement in terms of "melt index" (ASTM D–1238–62T) used to characterize higher molecular weight polymers in terms of the number of grams of molten polymer at 190° C. which flow from a standard orifice in 10 minutes under 44 pounds per square inch pressure. However, in terms of melt index our suitable copolymers would have values very greatly in excess of 1,000, a melt index of 1,000 being roughly equivalent to about 11,000 centipoises.

Suitable naturally occurring vegetable or insect waxes for use in the oil-retaining wax blend include those conventionally employed in the preparation of wax-oil base carbon inks, such as ouricuri wax, carnauba wax, candellila wax, sugar cane wax, beeswax and the like. The function of such wax is to retain the oil and release it only partially, together with color, on impact. Thus the suitability of a wax for transfer ink purposes depends on its oil-retention properties.

Oil retention of the wax is tested by mixing hot mineral oil and molten wax in a 1:1 ratio and allowing the mixture to cool and solidify. The solid is then placed on a paper towel and cut with a knife. If the fracture is clean and sharp and if no oil appears on the paper towel, the wax has good oil retention. If the fraction exhibits oil bleed or a crumbly mushy texture, it has poor oil retention. A somewhat more severe test for oil retention is carried out by preparing a 50/50 mixture of mineral oil and wax, pouring the molten oil-wax blend into a cylinder mold, allowing the blend to cool, removing it from the cylinder and placing the cylinder on several layers of filter paper in an oven, allowing it to remain in the oven at 105° F. overnight, then examining the diameter and depth of oil bleed into the filter paper. Oil bleed under pressure is determined by pressing the solid wax-oil sample with the side of a spatula and observing whether the oil bleeds out.

Heat stability of the wax, i.e. its tendency to discolor or to increase in viscosity or to body or gel on heating, is also important because it gives an indication of the expected performance of the inks containing it, when applied in coating apparatus. This test is carried out by melting the wax, holding it at 250° F. for 72 hours, then examining the wax and observing whether any gelation or bodying has taken place. If the wax has remained fluid, with no discernible gelation, it is considered satisfactory for use as color carrier in carbon-black-containing typewriter carbon inks.

Any fully refined paraffin wax of softening point 125° F. to 140° F. can be used, and serves as the primary ink vehicle to carry the color and other components and to aid in producing a smooth-flowing, low viscosity, ink.

The non-drying oil is preferably a mineral oil, such as an "ink oil," having a viscosity between about 75 and about 150 SUS at 100° F.

Toners such as methyl violet base, or nigrosine, may be employed.

Carbon black is the major color imparting component of our ink, but may be supplemented with other pigments, toners, etc. White or colorless extenders such as china clay are customarily included; and may equal or exceed the proportion of carbon black in the composition.

In preparing the coatings of our invention, the waxes, natural and synthetic, are blended by melting them together. Then methyl violet base or other toner is added. Mineral oil and paraffin wax are added followed by carbon black and other pigments and additives which can be added to the general mix as such, or preblended with a portion or all of one of the other ingredients. Order of mixing is not critical, but the sequence stated above is satisfactory. Components are advantageously ground in heated ball mills, cold ink mills or mixed in a heated paint shaker at temperatures, for example, of about 200–250° F. for a period to produce through blending, usually about 5–10 minutes in the case of the ink mills, about 3–8 hours in the ball mills and about 10–30 minutes in a heated paint shaker.

The resulting inks have viscosities at elevated temperatures suitable for hot melt coating in conventional hot melt coating equipment, they are smooth flowing, free from gelling tendencies and produce transfer papers capable of imparting sharp impressions with the usual typewriter impacts that are free from oil bleeding or smudging tendencies. Suitable viscosities are preferably between about 20 centipoises and about 500 centipoises or higher at 200° F.

The following specific examples further illustrate the invention. Parts are by weight except as otherwise noted.

*Examples 1 and 2*

Two ethylene/vinyl acetate copolymer waxes, one containing 10% by weight vinyl acetate, the other containing 15% by weight vinyl acetate, and having the properties shown in Table I below, were blended with ouricuri wax in proportions of 1 part copolymer to 3 parts ouricuri wax, and this blend was substituted for all the vegetable wax component in a standard typewriter carbon paper ink formulation as shown in Table II.

The resulting inks were all free of gelation tendencies and had viscosities within suitable ranges at the standard operating temperatures used in hot melt coating applications as indicated in the table.

TABLE I.—PROPERTIES OF ETHYLENE/VINYL ACETATE COPOLYMERS USED IN EXAMPLES 1 AND 2

| Example No | 1 | 2 |
|---|---|---|
| Percent Vinyl acetate | 10 | 15 |
| Molecular weight | 3,500 | 4,080 |
| Softening Point Ring & Ball | 199 | 200 |
| Viscosity cps. at 140° C | 705 | 775 |
| Density at 76° F | 0.914 | 0.924 |
| Needle penetration (dmm.) (77° F. 100 g. 5 sec.) | 7.5 | 6.6 |
| Heat Stability | (1) | (1) |
| Mineral Oil Retention | (1) | (1) |

[1] Excellent.

TABLE II.—CARBON PAPER INK FORMULATIONS AND PROPERTIES

| Example No. | Percent by Weight | | |
|---|---|---|---|
| | 1 | 2 | Control |
| Et/VA-10 [1] | 4.5 | | 0 |
| Et/VA-15 [2] | | 4.5 | 0 |
| Ouricuri Wax | 13.5 | 13.5 | 18 |
| Refined Paraffin Wax | 30 | 30 | 30 |
| Mineral Oil (113 SUS at 100° F.) | 23 | 23 | 23 |
| Methyl Violet Base | 1 | 1 | 1 |
| Carbon Black | 10 | 10 | 10 |
| China Clay | 18 | 18 | 18 |
| Properties: | | | |
| Viscosity cps. at 200° F | 60 | 355 | 20 |
| Mineral Oil Retention | ([3]) | ([3]) | ([3]) |
| Gelation | None | None | None |

[1] 10% Vinyl acetate.  [2] 15% vinyl acetate.  [3] Excellent.

When the compositions of Examples 1 and 2 are coated on standard carbon tissue by hot melt application in a standard Mayer coater at about 200° F. in the case of Example 1, and at about 400° F. in the case of Example 2, at about 4 pounds per ream, they flow smoothly through the coating operations and the resulting carbon paper is suitable as a typewriter carbon paper producing good reproduction with a sharp imprint with virtually no oil bleed, and with virtually no blocking tendency.

Substitution of standard polyethylene wax of about 2,000 average molecular weight and melting point of about 219°–226° F. in the compositions of Examples 1 and 2 resulted in inks which had good oil retention properties but which resulted in gelled, thixotropic compositions due to the bodying action thereon of the carbon black pigment rendering the compositions unsuitable for hot melt application to the substrate in the standard manner.

Substitution of an oxidized polyethylene wax of about 2,000 average molecular weight, acid number 14–17, produced inks which exhibited some oil bleeding and which were thixotropic due to gelation by the carbon black and were similarly unsuitable for standard hot melt application.

*Example 3*

An oil-retentive wax composition was prepared by melting together 25 parts by weight of an ethylene/vinyl acetate copolymer containing 15% vinyl acetate and having properties similar to those of the copolymer employed in Example 2 above, with 75 parts of carnauba wax. The above blend was then mixed with mineral oil in the proportion of 50 parts of mineral oil and 50 parts of wax blend. Portions of the molten wax-oil blend were placed in cylindrical molds, allowed to cool to about 25° C. and solidify, and were then removed from the cylinder. For comparative purposes, a molten blend of 50 parts mineral oil and 50 parts of carnauba wax was prepared and cast from identical cylinders. One of the ethylene/vinyl acetate copolymer-carnauba wax-oil cylinders was placed on a paper towel and cut with a knife. The cut was clean and sharp and no oil appeared on the paper towel. The sample was then pressed with the side of a spatula. No oil bleed appeared.

Cylinders of each of the carnauba wax mineral oil blend and the ethylene/vinyl acetate copolymer-carnauba wax mineral oil blend were placed side by side in an oven, each on several sheets of filter paper. The cylinders were allowed to remain in the oven at 105° F. overnight. The filter papers were then examined for extent and depth of oil bleed. No oil bleed whatsoever was discernible on the filter paper taken from beneath either cylinder, and no oil penetrated the top sheet of filter paper.

The inks of our invention may be applied to any suitable substrate, including cellulosic transfer tissues, paper, synthetic films, metal, cloth or other substrates, including flexible or rigid bases or substrates.

While the above describes the preferred embodiments of our invention, it will be understood that departures may be made therefrom within the scope of the specification and claims.

We claim:

1. An oil-retentive wax composition comprising between about 10% and about 30% by weight of an ethylene/vinyl acetate copolymer containing between about 10% and about 30% vinyl acetate and having an average molecular weight between about 1,000 and about 5,000, and between about 90% and about 70% by weight of a naturally occurring wax selected from the group consisting of vegetable waxes and insect waxes.

2. A pressure transferable ink composition comprising a mixture of a petroleum wax, a mineral oil, carbon black pigment and a non-petroleum, oil-retaining wax mixture blend, said oil-retaining wax mixture containing between about 70% and about 90% of a naturally-occurring oil-retentive wax and between about 30% and about 10%, based on the weight of the oil-retaining wax mixture, of a waxy ethylene/vinyl acetate copolymer having between about 10% and about 30% vinyl acetate and an average molecular weight between about 1,000 and about 5,000, as determined by the thermistor method of J. J. Neumayer, said oil-retaining wax mixture being present in an amount of at least about 0.6 part by weight per 1 part by weight of mineral oil present, said ink composition being fluid and non-gelling at temperatures of about 250° F. and having a viscosity of 200° F. sufficiently low for application to substrates by conventional hot melt coating techniques.

3. The composition according to claim 1 wherein the naturally occurring wax is a vegetable wax.

4. The composition according to claim 1 wherein the naturally occuring wax is ouricuri wax.

5. A pressure transferable ink composition comprising (1) between about 20% and about 40% of a refined paraffin wax; (2) between about 15% and about 30% of a mineral oil having a viscosity between about 75 and about 150 SUS @ 100° F.; (3) between about 5% and about 15% of carbon black, and (4) between about 12% and about 20% of an oil-retaining wax consisting essentially of a homogeneous blend of (a) between about 10% and about 30% by weight of an ethylene/vinyl acetate copolymer containing between about 10% and about 30% vinyl acetate and having an average molecular weight between about 1,000 and about 5,000 and (b) between about 90% and about 70% by weight of a naturally occurring wax selected from the group consisting of vegetable waxes and insect waxes.

6. A transfer sheet adapted for use with a pressure or impact instrumentality comprising a base coated with the transfer ink of claim 2.

References Cited

UNITED STATES PATENTS

| 2,732,795 | 1/1956 | Brandt et al. | 101—128.2 |
| 2,877,196 | 3/1959 | Reding | 260—28.5 |
| 3,207,716 | 9/1965 | Lippoldt | 260—23 |

MORRIS LIEBMAN, *Primary Examiner.*

H. S. KAPLAN, *Assistant Examiner.*